United States Patent [19]
Pence et al.

[11] Patent Number: 5,871,150
[45] Date of Patent: Feb. 16, 1999

[54] PORTABLE TANKER-TRAILER HEATING SYSTEM

[75] Inventors: Jeffry S. Pence, Edinburg; Theodore L. Barger, Mt. Jackson, both of Va.

[73] Assignee: Appalachian Truck Service, Inc., Edinberg, Va.

[21] Appl. No.: 984,217

[22] Filed: Dec. 3, 1997

[51] Int. Cl.⁶ .................................................... B60H 1/00
[52] U.S. Cl. ............................ 237/28; 237/12.3 B; 237/6
[58] Field of Search ................................ 237/28, 12.3 B, 237/69; 122/195; 126/358, 265

[56] References Cited

U.S. PATENT DOCUMENTS

| | | | |
|---|---|---|---|
| 3,762,392 | 10/1973 | Long | 126/210 |
| 3,763,848 | 10/1973 | Williams | 126/101 |
| 3,794,242 | 2/1974 | Hagdorn | 237/59 |
| 5,524,820 | 6/1996 | Regan | 237/19 |
| 5,690,094 | 11/1997 | Sheinfeld et al. | 126/350 R |

*Primary Examiner*—Henry A. Bennett
*Assistant Examiner*—Derek Boles
*Attorney, Agent, or Firm*—Jones, Tullar & Cooper, P.C.

[57] ABSTRACT

A heating system for heating a tanker-trailer, including a housing, a fuel tank, a heating unit, fuel lines connecting the fuel tank to the heating unit, hot and cold water lines, connected at one end to the heating unit and at their other end to the tanker-trailer, and a control apparatus for controlling the flow of fuel from the fuel tank to the heating unit, water flow to and from the tanker-trailer, and the temperature of the water.

7 Claims, 5 Drawing Sheets

PORTABLE TANKER-TRAILER HEATING SYSTEM

BACKGROUND OF THE INVENTION

Tanker-trailers of the type which transport cargo often require that the cargo be maintained at a predetermined temperature. This does not present a problem for the carrier during the actual travel time spent with the cargo, as the trailer is equipped with a temperature control system which operates off the heating system of the tractor.

During stop-overs, however, and those times when the trailer is disconnected from the tractor, the temperature maintenance noted above is not possible unless the tractor is maintained in contact with the trailer. This can result, in those cases where the cargo is a perishable food, in food spoilage. And in those cases where the tractor and trailer hook-up is maintained, just to provide for temperature control, an inefficient condition is created since the tractor is being used for a purpose for which it was not intended when it could be used for its intended purpose of transporting.

It would, therefore, be desirable to have a way of maintaining the desired predetermined temperatures for the trailer and its cargo without having to use a tractor during the noted stop-overs.

SUMMARY OF THE INVENTION

It is an object of the present invention to provide a water heating system which is portable and adaptable for providing heat at a remote location.

An object of the present invention, as it relates to tanker-trailers, is to provide a way to maintain a desired predetermined temperature for the tanker-trailers and their cargos without having to use a tractor. More specifically, this object of the present invention is to provide a system which can stand alone and be readily transported at, for example, a stop-over location. It is also a related object of the present invention to provide such a system as noted above which utilizes existing trailer systems for temperature control.

These objects are achieved by the provision of a stand alone heating system including a heating unit which is connected to the remote location, such as a tanker-trailer. The heating system draws water from an external source, such as the tanker-trailer, or utilizes its own water supply, heats the water to a given temperature and returns it to the remote location, such as the tanker-trailer for circulation at the remote location, such as through the tanker-trailer water jacket system for heating the cargo.

Neither the tractor nor the tanker-trailer need be modified in any way to achieve the above result as it applies to a tanker-trailer. It is only necessary to have the stand alone heating unit and a fuel supply connected to the heating unit. The heating unit is in turn connected to the remote location, such as the tanker-trailer and the process of heating the water and returning the heated water to the remote location, such as the tanker-trailer continues for as long as desired.

The heating system is provided with a connecting apparatus for connecting a cold water line and a heated water line to the remote location, such as the tanker-trailer. It also includes a fuel reservoir with feed lines to the heating unit. Conveniently, the system comprises the heating unit, a water supply (optional), fuel reservoir, control panel and connecting apparatus housed in a mobil housing provided with wheels for readily moving the system at will. The control panel is provided with controls for controlling the flow of both water and fuel and for controlling the temperature of the water.

BRIEF DESCRIPTION OF THE DRAWINGS

Six figures have been selected to illustrate the preferred embodiment of the present invention, i.e., as it applies to a tanker-trailer. It is noted that those skilled in the art should have no difficulty in practicing the present invention from a consideration of the figures and the description thereof that follows.

DETAILED DESCRIPTION OF THE PREFERRED EMBODIMENT

Figure 1:
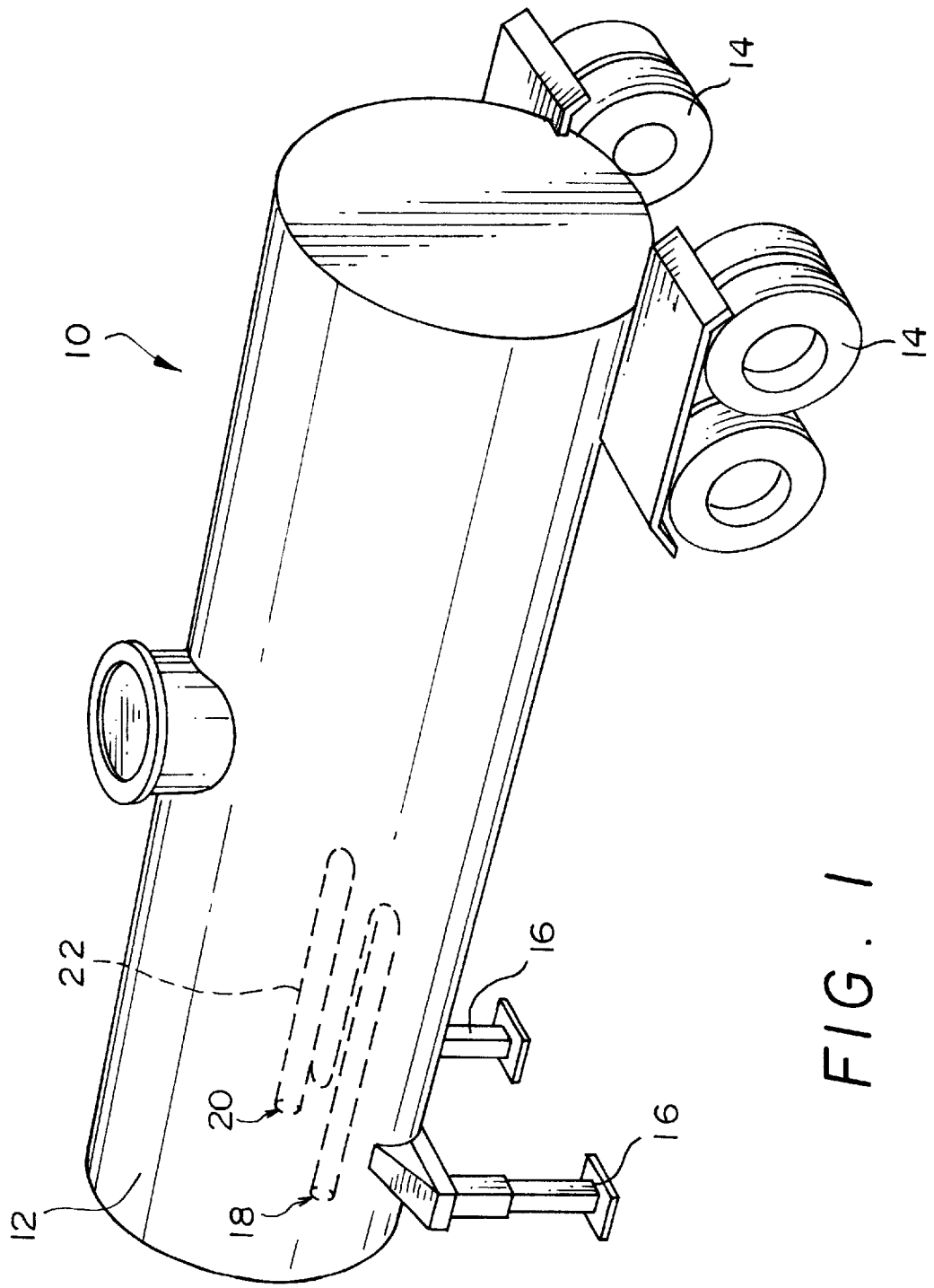
FIG. 1 is a perspective view of a tanker-trailer which is typical of those tanker-trailers serviced by the system of the present invention.
Figure 2:
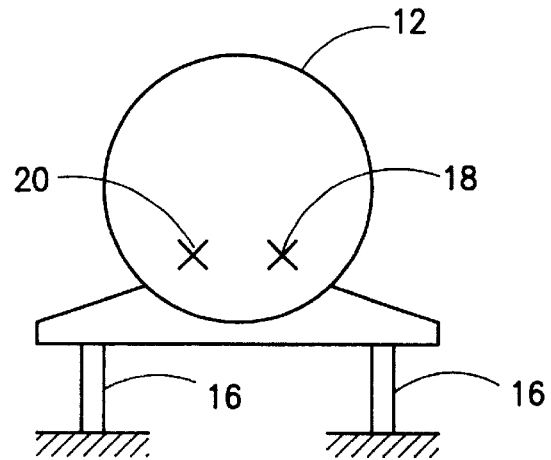
FIG. 2 is a front view of the tanker-trailer shown in FIG. 1.

A typical tanker-trailer 10 is shown disconnected from a tractor (not shown) in FIG. 1. The tanker-trailer 10 includes a tanker body 12 supported by a set of wheels 14 and adjustable front support struts 16. As shown in FIG. 2 the tanker body 12 at its front end includes connections 18 and 20 which represent inlet and return connections for the tanker-trailer water jacket system 22. This water jacket system is standard in tanker-trailers of the kind shown.

As noted previously a means for heating the cargo contained in the tanker-trailer body 12 during transportation is readily achieved by the connection of the connections 18 and 20 of tanker-trailer body 12 with the tractor. However, when the tanker trailer 10 is disconnected from the tractor, as is the case in FIG. 1, the cargo in the tanker-trailer body 12 is maintained at its desired temperature by the heating system according to the present invention. This heating system is shown and described in greater detail in FIGS. 3–6.

Figure 3:
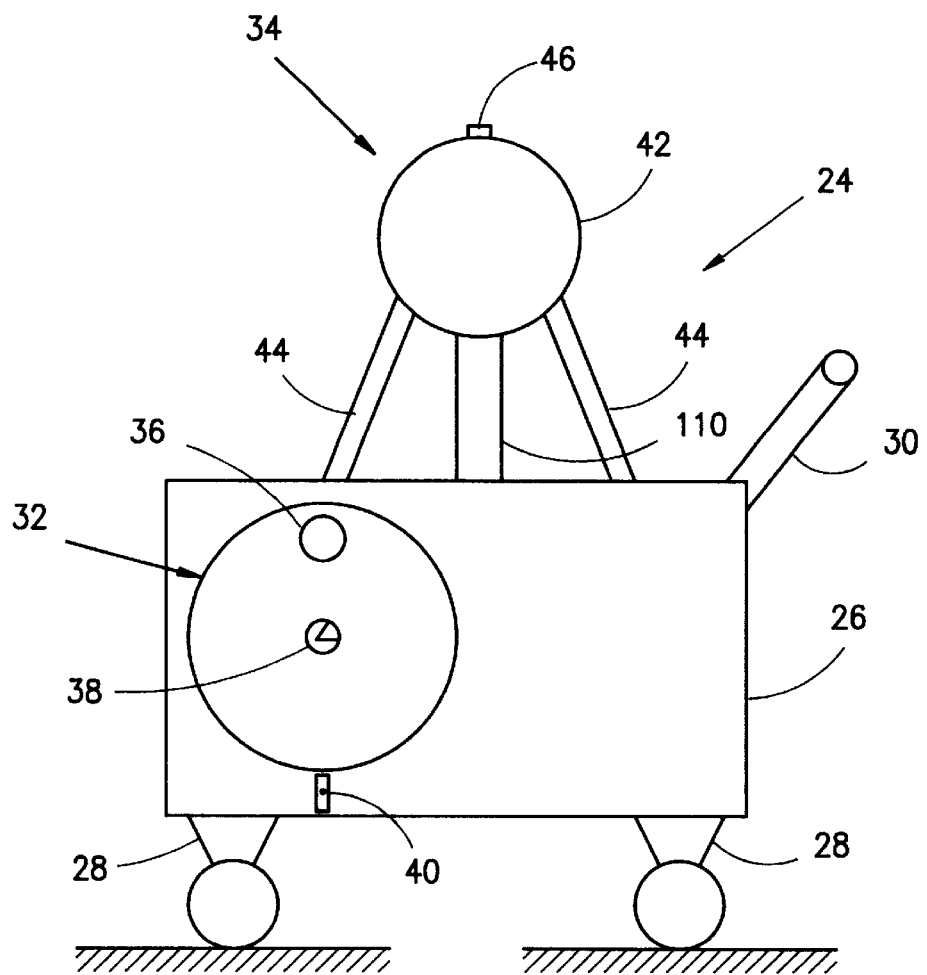
FIG. 3 is a schematic illustration of the heating system without its connecting apparatus shown.

Turning first to FIG. 3, there is shown in assembly a portable heating system 24 according to the present invention. The system includes a housing 26. The assembly is preferably portable and for this purpose the housing 26 is mounted on casters or wheels 28. A handle 30 is provided on the housing for manually moving the system assembly at will. Two of the components of the system are shown in FIG. 3 including a fuel tank 32 and a water tank and aeration system 34. The fuel tank 32 includes a capped fuel inlet 36, a fuel gauge 38 and a fuel drain valve 40. The water tank and aeration system 34 includes a tank body 42 mounted by support struts 44 onto the housing 26. A capped water inlet 46 is provided on the top of the water tank 42.

Figure 4:
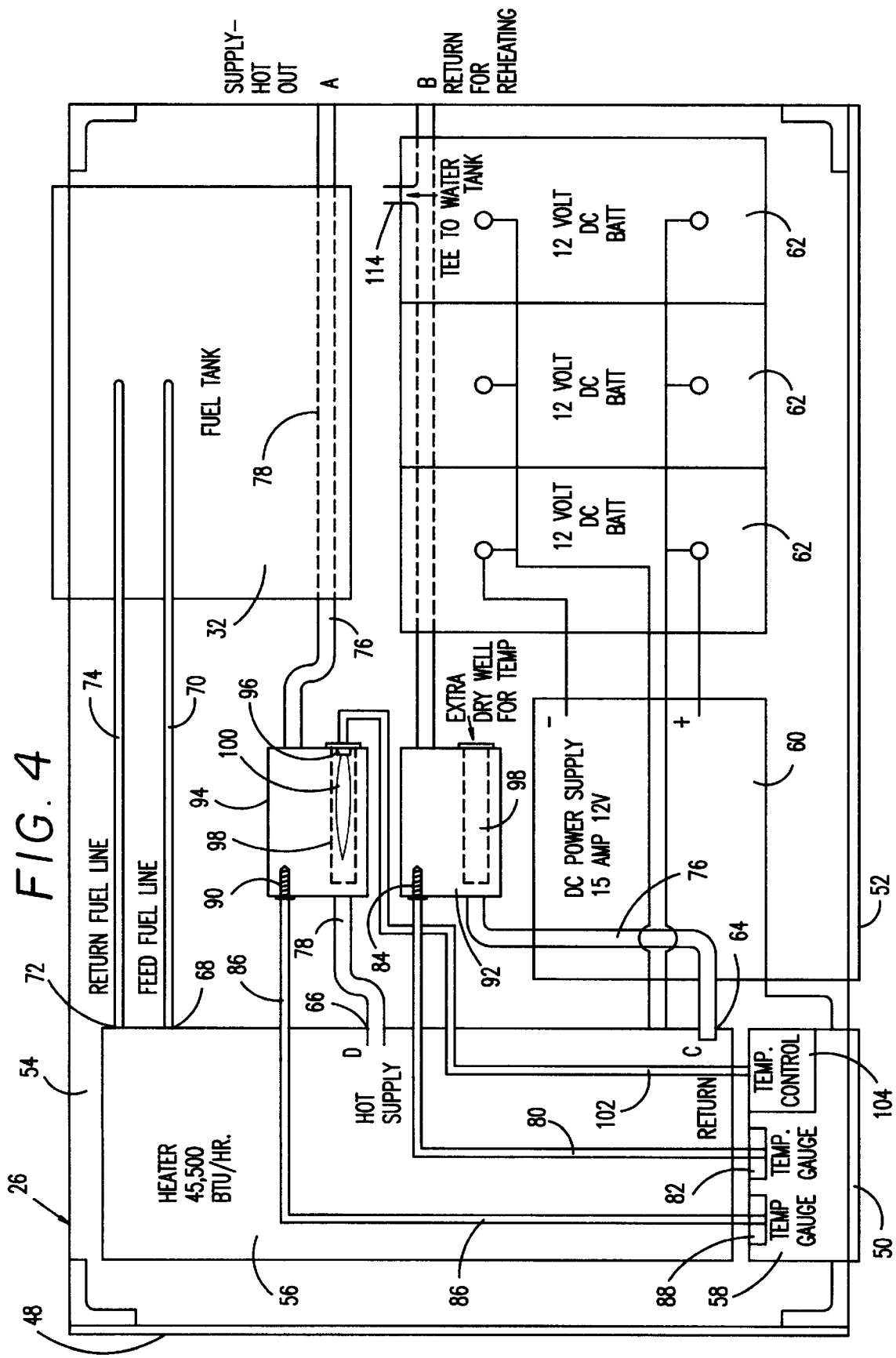
FIG. 4 is a schematic layout of the system and its components according to the present invention.

As seen in FIG. 4, the housing 26 has doors 48, 50 and 52 which open into an interior space 54 which houses all the components of the system except for the water and aeration system 34. The space 54 contains a heating unit 56, a control box 58, the fuel tank 32 and a power supply source including a DC power supply 60 as well as a plurality of reserve batteries 62. The DC power supply 60 comprises an AC to DC converter which operates off of a standard AC source. In the event of a failure of the AC power source, the plurality of batteries 62 will provide the necessary power to operate the system.

The heating unit 56 may be a unit manufactured by Webasto Thermosystems, Inc. and identified by the designation DBW 2010, which is a 45,000 Btu/hr unit. The heating unit 56 has a number of connecting points. Included is a cold water inlet port 64, a hot water outlet port 66, fuel inlet connecting port 68 to which a fuel feed line 70 is connected to the fuel tank 32, and a fuel return port 72 to which a fuel return line 74 is connected.

The fuel tank 32 can be accessible through a door in the housing 26, or it may extend outwardly as shown in FIGS. 3 and 4.

The system has two water lines, a cold water line 76 and a hot water line 78. At one end the cold water line 76 is connected to the cold water inlet port 64, and the hot water line 78 is connected to the hot water outlet port 66. At their other end (not shown), the two water lines are connected to the connections 18 and 20 on the tanker-trailer body 12. At the control box 58, a cold water gauge line 80 is connected to a cold water temperature gauge 82 and to a sensor 84, and a hot water gauge line 86 is connected to a hot water temperature gauge 88 and to a sensor 90. In each water line there is provided a heat exchanger. A heat exchanger 92 is provided in the cold water line 76, and a heat exchanger 94 is provided in the hot water line 78. These heat exchangers serve as a source for checking and controlling the cold and hot water temperatures.

The heat exchangers are preferably made of aluminum tube, caped at both ends, one end of each tube has a barbed hose adaptor 96 and a copper dry well 98 to insert a capillary bulb 100 (shown only in well 94) that senses water temperature and conveys it through a line 102 to a temperature control 104 for starting and stopping the combustion burner as needed to maintain constant water temperature. Water temperature can be controlled on the intake or outlet side of the heater, or both, depending upon the users needs or discretion.

The capillary bulb is a standard Honeywell temperature controller, and can be purchased at any furnace supplier.

The main power supply 60 is 12 volt Dc. The system incorporates a secondary battery backup 62 that can sustain normal operation of the unit for a specified amount of time, for example, up to 50 hours run time.

The primary 12 volt Dc power supply is supplied by a 120 volt Ac to 12 volt Dc converter, which also maintains a 12 volt charge on the Dc battery. A 12 volt Dc wet cell, gel cell or dry cell can be used.

Figure 5:
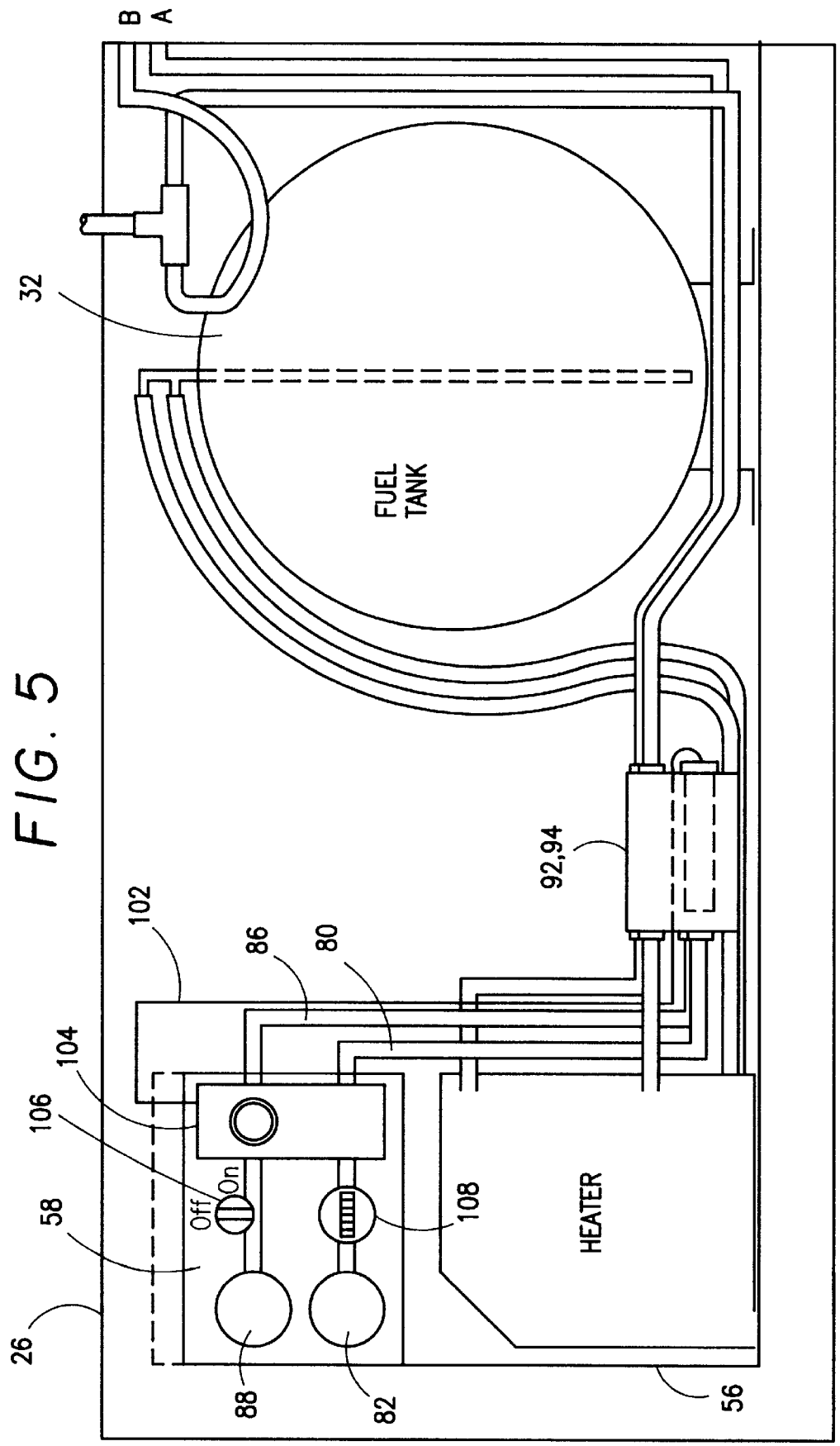
FIG. 5 is a elevational view showing the system as it is housed.

As shown in FIG. 5, the control panel 58 includes an on-off knob 106 for fuel flow and a meter 108 for indicating water flow.

Figure 6:
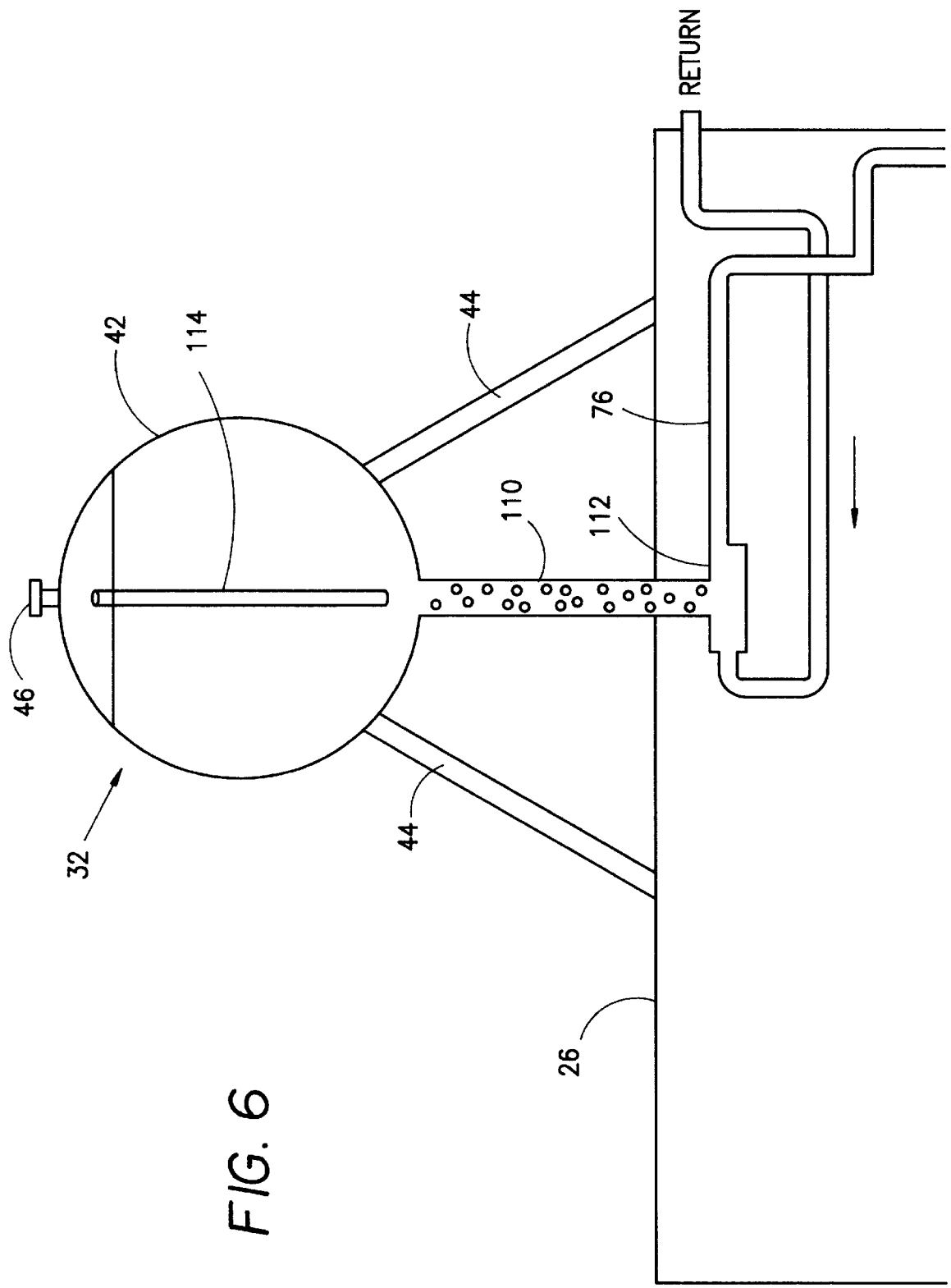
FIG. 6 is a schematic elevational view of a tank or water reservoir containing water for use in the system and for aeration.

FIG. 6 illustrates the auxiliary water tank and aeration or air bleed off system 34.

The system 34 is connected to the cold water line 76 by means of a brass pipe 110 through a T-connection 112. Any air trapped in the line 76 rises in the pipe.

The water level is monitored through a sight tube 114 located on the side of the tank and refilled through the filler cap 46 on top of the tank 42.

When a tanker-trailer, for example, is disconnected at an off-cite location, the lines 76 and 78 are connected to connections 18 and 20 and the system primed with water from the water jacket system 22, or from the water tank 42. The temperature is set to the desired level with the temperature selector 104 and the system started by turning the burner on with the on off knob 106. The temperatures are monitored at the heat exchangers and controlled to maintain the desired temperatures.

What is claimed is:

1. A portable heating system for heating the contents of a tanker-trailer, comprising:

a portable housing;

a fuel tank mounted within said portable housing;

a heating unit mounted within said portable housing for heating water;

fuel lines connecting said fuel tank with said heating unit;

hot and cold water lines connected at one end to slid heating unit and at their other end to the tanker-trailer for delivering heated water to the tanker-trailer from said heating unit and returning cold water from the tanker-trailer to said heating unit; and control means for controlling the flow of fuel from said fuel tank to said heating unit, water flow to and from the tanker-trailer, and the temperature of the water.

2. The portable heating system as defined in claim 1, further comprising:

a water tank and aeration system mounted to said portable housing, said water tank and aeration system being connected to said cold water line.

3. The portable heating system as defined in claim 1, wherein said control means includes a control panel mounted within said portable housing.

4. The portable heating system as defined in claim 1, wherein said control means includes a heat exchanger located in each of said hot and cold water lines.

5. The portable heating system as defined in claim 3, wherein said control means includes a source of electrical power connected to said heating unit and said control panel.

6. The portable heating system as defined in claim 5, wherein said source of electrical power is mounted within said portable housing.

7. The portable heating system as defined in claim 2, wherein said control means includes a control panel mounted within said portable housing, a source of electrical power mounted with said portable housing and connected to said heating unit and said control panel, and a heat exchanger located in each of said hot and cold water lines.

* * * * *